United States Patent
Komano et al.

(10) Patent No.: US 9,413,729 B2
(45) Date of Patent: Aug. 9, 2016

(54) SYMMETRIC ENCRYPTION APPARATUS AND STORAGE MEDIUM, AND SYMMETRIC DECRYPTION APPARATUS AND STORAGE MEDIUM

(71) Applicant: KABUSHIKI KAISHA TOSHIBA, Tokyo (JP)

(72) Inventors: Yuichi Komano, Kanagawa (JP); Koichiro Akiyama, Tokyo (JP); Yasuhiro Goto, Hokkaido (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 14/565,785

(22) Filed: Dec. 10, 2014

(65) Prior Publication Data

US 2015/0172258 A1 Jun. 18, 2015

(30) Foreign Application Priority Data

Dec. 13, 2013 (JP) ................... 2013-258653

(51) Int. Cl.
*H04L 29/06* (2006.01)
*H04L 9/00* (2006.01)
*H04L 9/08* (2006.01)

(52) U.S. Cl.
CPC ............ *H04L 63/0435* (2013.01); *H04L 9/008* (2013.01); *H04L 9/0816* (2013.01); *H04L 2209/24* (2013.01)

(58) Field of Classification Search
CPC ......... H04L 9/008; H04L 9/06; H04L 9/0606; H04L 9/0618; H04L 9/0816; H04L 9/0861
See application file for complete search history.

(56) References Cited

U.S. PATENT DOCUMENTS

2013/0329883 A1* 12/2013 Tamayo-Rios ............ H04L 9/28
380/28

OTHER PUBLICATIONS

Hojsik et al.; "A Fully Homomorphic Crytosystem with Approximate Perfect Secrecy", © Springer-Verlag Berlin Heidelberg 2013, E. Dawon (Ed.): The Cryptographers' Track at the RSA Conference 2013, LNCS 7779, pp. 375-388 and cover sheets (2 pages), (2013).

* cited by examiner

*Primary Examiner* — Edward Zee
(74) *Attorney, Agent, or Firm* — Finnegan, Henderson, Farabow, Garrett & Dunner, LLP

(57) ABSTRACT

In a symmetric encryption apparatus according to an embodiment, a storage unit stores a symmetric key formed from a plurality of elements of a first polynomial ring. A plaintext acceptance unit accepts input of plaintext information. A plaintext polynomial generation unit generates a plaintext polynomial by embedding the plaintext information whose input has been accepted in at least one of terms of a polynomial in a subspace of the first polynomial ring. A mask polynomial generation unit generates a mask polynomial having the symmetric key as a solution based on a second commutative ring defined over the first polynomial ring. An encryption unit generates a ciphertext using the plaintext polynomial and the mask polynomial.

10 Claims, 7 Drawing Sheets

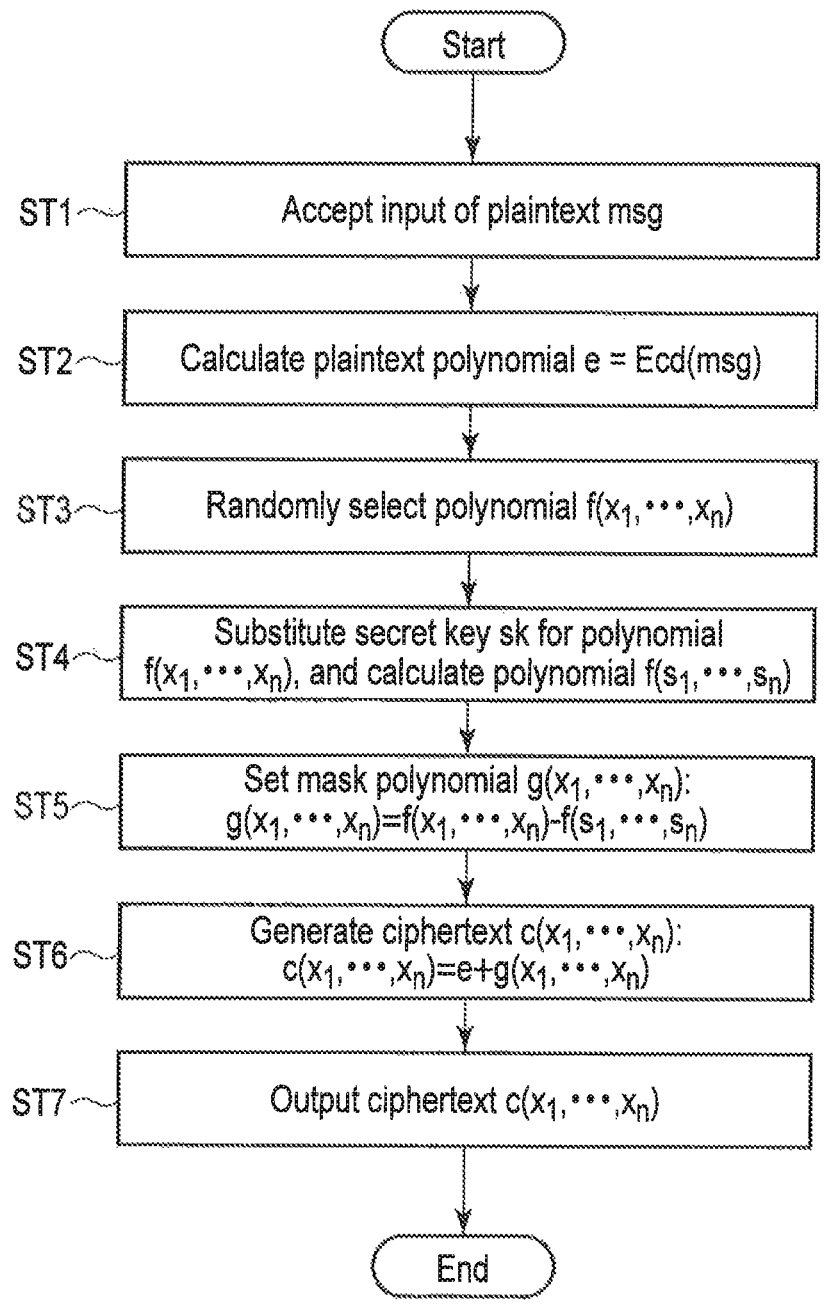
F I G. 3

SYMMETRIC ENCRYPTION APPARATUS AND STORAGE MEDIUM, AND SYMMETRIC DECRYPTION APPARATUS AND STORAGE MEDIUM

CROSS-REFERENCE TO THE RELATED APPLICATIONS

This application is based upon and claims the benefit of priority from the prior Japanese Patent Applications No. 2013-258653, filed on Dec. 13, 2013; the entire contents of which are incorporated herein by reference.

FIELD

Embodiments described herein relate generally to a symmetric encryption apparatus and a storage medium, and a symmetric decryption apparatus and a storage medium.

BACKGROUND

Cryptography is used to conceal communication contents. Cryptography includes a symmetric encryption scheme and an asymmetric encryption scheme. The symmetric encryption scheme uses a shared secret key in encryption processing and decryption processing. The asymmetric encryption scheme uses asymmetric keys (a public key and private key that are different from each other) in encryption processing and decryption processing.

A representative symmetric encryption scheme is AES (Advanced Encryption Standard). AES improves the security level by repeatedly processing a round function that can be processed at high speed. Note that AES has no homomorphism (to be described later).

A symmetric encryption scheme Enc is called homomorphic encryption when the following conditions are satisfied. Assume that two ciphertexts corresponding to a secret key sk and two plaintexts $m_1$ and $m_2$ are represented by $c_1$=Enc(sk, $m_1$) and $c_2$=Enc(sk, $m_2$). When it is possible to calculate a new ciphertext c'=$c_1$ (*) $c_2$=Enc($m_1$(+) $m_2$) from the two ciphertexts $c_1$ and $c_2$ without decoding into the plaintexts $m_1$ and $m_2$, the encryption scheme Enc is called homomorphic encryption. Note that (*) and (+) represent operators.

When the operator (+) represents addition, the encryption scheme Enc is called additive homomorphic encryption. When the operator (+) represents multiplication, the encryption scheme Enc is called multiplicative homomorphic encryption. When there are two types of ciphertext calculation (*) for implementing additive homomorphism and multiplicative homomorphism, the encryption scheme Enc is called (somewhat) fully homomorphic encryption.

The above-described symmetric encryption scheme generally has no specific problem. From a study, however, the present inventor considers that it is possible to increase the parallelism and improve the calculation efficiency.

BRIEF DESCRIPTION OF THE DRAWINGS

FIG. 3 is a flowchart for explaining encryption processing according to the first embodiment;

DETAILED DESCRIPTION

Figure 1:
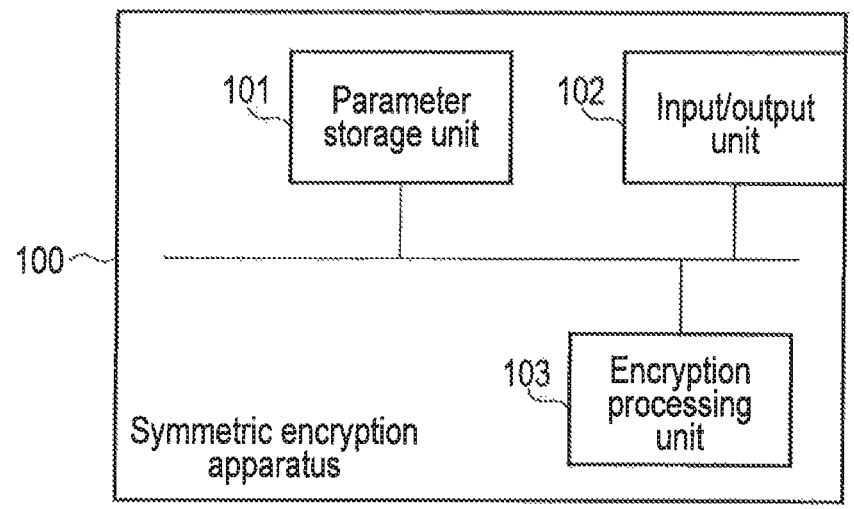
FIG. 1 is a block diagram schematically showing the arrangement of a symmetric encryption apparatus according to the first embodiment.

In general, according to one embodiment, a symmetric encryption apparatus comprises a storage unit, a plaintext acceptance unit, a plaintext polynomial generation unit, a mask polynomial generation unit, and an encryption unit.

The storage unit stores a symmetric key formed from a plurality of elements of a first polynomial ring.

The plaintext acceptance unit accepts input of plaintext information.

The plaintext polynomial generation unit generates a plaintext polynomial by embedding the plaintext information whose input has been accepted in at least one of terms of a polynomial in a subspace of the first polynomial ring.

The mask polynomial generation unit generates a mask polynomial having the symmetric key as a solution based on a second commutative ring defined over the first polynomial ring.

The encryption unit generates a ciphertext using the plaintext polynomial and the mask polynomial.

Each embodiment will be described below with reference to the accompanying drawings. Note that each apparatus to be described below can be implemented by a hardware arrangement, or a combination of hardware and software resources. As software of the combination, a program for causing a computer to implement the function of each apparatus when it is installed in advance from a network or non-transitory computer-readable storage medium into the computer and executed by the processor of the computer is used.

<Overview of First Embodiment>

An overview of the first embodiment will be described in the order of notation, encryption processing, and decryption processing.

Notation used in this embodiment will be explained first.

Let A be a commutative ring, and S=A[$t_1, \ldots, t_{m'}$]= $\{\Sigma c_{i1,i2,\ldots im} t_1^{i1} t_2^{i2} \ldots t_{m'}^{im'} | c_{i1,i2,\ldots im} \in A\}$ be an m'-variable polynomial ring with variables $t_1, \ldots, t_{m'}$ (S will also be referred to as the first commutative ring).

A commutative ring with a polynomial as an element is represented by R=S[$x_1, \ldots, x_m$] (R will also be referred to as the second commutative ring). For example, S may have the elements of an integer ring Z=$\{0, \pm1, \pm2, \ldots\}$ as coefficients, and may be a polynomial ring Z[$t_1, \ldots, t_{m'}$] with the variables $t_1, \ldots, t_{m'}$ for m'≥1. The commutative ring R may be a polynomial ring (Z[$t_1, \ldots, t_{m'}$]) [$x_1, \ldots, x_m$] with the polynomial ring S=Z[$t_1, \ldots, t_{m'}$] as a coefficient.

The commutative ring R and the polynomial ring S may be public parameters in a system, or secret information between communication parties sharing a symmetric key.

A secret key sk is formed from n elements $(s_1, s_2, \ldots, s_n)$ of the polynomial ring S. For example, $sk=(s_1(t_1, \ldots, t_{m'}), \ldots, s_n(t_1, \ldots, t_{m'}))$ may be given where each element $s_i$ of the secret key sk is a polynomial $s_i(t_1, \ldots, t_{m'})$ with the variables $t_1, \ldots, t_{m'}$. Assume that $s_i$ represents a polynomial where the degree for each of the variables $t_1, \ldots, t_{m'}$ is equal to or smaller than a predetermined value (the degree is represented by d). Alternatively, each element $s_i$ of the secret key sk may be a polynomial $s_i(t)$ with a variable t, thereby obtaining $sk=(s_1(t), \ldots, s_n(t))$. In this case, $s_i$ represents a polynomial where the degree of the variable t is equal to or smaller than a predetermined value (the degree is represented by d).

In this embodiment, plaintext information msg as a document to be encrypted is encoded into elements in a subspace M of the polynomial ring S. The plaintext information will be referred to as a plaintext hereinafter.

The subspace M is a set including a polynomial as an element. Each term of a polynomial is called a base. Assume that the subspace M is a set including, as an element, a polynomial formed from two or more bases.

Encoding processing from the plaintext msg to an element e in the subspace M is represented by e=Ecd(msg). Note that the encoding result e is a polynomial with the elements of the commutative ring A as coefficients and a variable $t_j$.

On the other hand, decoding processing from the element e in the subspace M of the ring S to the decrypted text msg' is represented by msg'=Dcd(e). The processing Ecd or Dcd may accept the secret key sk as an input in addition to the plaintext msg or encoding result e, and execute encoding processing e=Ecd(sk, msg) or decoding processing msg'=Dcd(sk, e). The processes Ecd and Dcd are designed to obtain msg=Dcd(Ecd(msg)) (the secret key sk is added as an input to the processes Ecd and Dcd, as needed).

If, for example, the polynomial ring is represented by $S=Z[t_1, \ldots, t_{m'}]$, the encoding processing Ecd may divide the plaintext msg into m' bit strings $msg_1 \| msg_2 \| \ldots \| msg_{m'}$ (where $\|$ represents bit concatenation) by representing the plaintext by bits, thereby outputting a plaintext polynomial $e=\Sigma msg_i t_i$. In this case, the decoding processing Dcd(sk, e) can decode the bit strings $msg_1 | msg_2 \| \ldots \| msg_{m'}$=msg. Assume that m' is a value that satisfies m'≤dw−1 for the above-described degree d and a degree w (to be described later).

Alternatively, for example, if the polynomial ring is represented by $S=Z[t]$, the encoding processing Ecd may divide the plaintext msg into m bit strings $msg_1 \| msg_2 \| \ldots \| msg_m$ by representing the plaintext by bits, thereby outputting a plaintext polynomial of degree (m−1), $e=\Sigma msg_i t^{i-1}$, with the variable t. In this case, the decoding processing Dcd(sk, e) can decode the bit strings $msg_1 \| msg_2 \| \ldots \| msg_m$=msg. Note that m is a value that satisfies m≤dw−1 for the above-described degree d and the degree w (to be described later).

Although a case in which the plaintext msg undergoes bit division has been explained, the present invention is not limited to this. The plaintext msg may undergo l-adic expansion (for example, $l=2^{16}=65536$), and each digit obtained by performing l-adic expansion may be associated with the bit string $msg_i$. At this time, decoding processing performs decoding into the plaintext msg by converting a value obtained by performing l-adic expansion into a predetermined format such as a binary or decimal number.

Although a case in which an encoding result is certainly calculated for the plaintext msg has been described, the present invention is not limited to this. An encoding result may stochastically be calculated for the plaintext msg by setting some of the bit strings $msg_i$ to random integers $rnd_i$. At this time, the decoding processing extracts the bit strings $msg_i$ except for the random integers $rnd_i$, and performs decoding into the plaintext msg.

The respective processes Ecd and Dcd may be public parameters in the system, or secret information between communication parties sharing a symmetric key.

An overview of encryption processing and decryption processing according to this embodiment will be described next.

The transmitter and receiver of a ciphertext share, as a symmetric key, the secret key $sk=(s_1, \ldots, s_n)$ formed from n elements of the polynomial ring S. Note that the transmitter corresponds to a symmetric encryption apparatus (to be described later). The receiver corresponds to a symmetric decryption apparatus (to be described later).

The transmitter of the ciphertext encodes the plaintext msg, and calculates the plaintext polynomial e=Ecd(msg).

The transmitter randomly generates a polynomial $f(x_1, \ldots, x_n)$ of degree w or lower from the commutative ring R or a subset of $R=S[x_1, \ldots, x_n]$. Note that the degree of $f(x_1, \ldots, x_n)$ is defined by the maximum value of the degrees of the respective terms of $f(x_1, \ldots, x_n)$ with variables $x_1, \ldots, x_n$.

If $S=A[t_1, \ldots, t_{m'}]$ holds, f is represented as a polynomial with the variables $t_1, \ldots, t_{m'}$ in addition to the variables $x_1, \ldots, x_n$. Unless misunderstood, f will be represented as a polynomial with variables $x_1, \ldots, x_n$. The same applies to $c(x_1, \ldots, x_n)$ and $g(x_1, \ldots, x_n)$ (to be described later).

The transmitter calculates the ciphertext $c(x_1, \ldots, x_n)=e+f(x_1, \ldots, x_n)-f(s_1, \ldots, s_n)$, and transmits it to the receiver.

The receiver of the ciphertext substitutes the secret key $(s_1, \ldots, s_n)$ for the received ciphertext $c(x_1, \ldots, x_n)$, thereby calculating the plaintext polynomial e given by:

$$c(s_1, \ldots, s_n)=e$$

After that, the receiver executes the decoding processing msg'=Dcd(e) based on the plaintext polynomial e, thereby performing decoding into the plaintext msg=msg'.

<Practical Arrangement of First Embodiment>

The first embodiment will be described in detail below.

Figure 2:
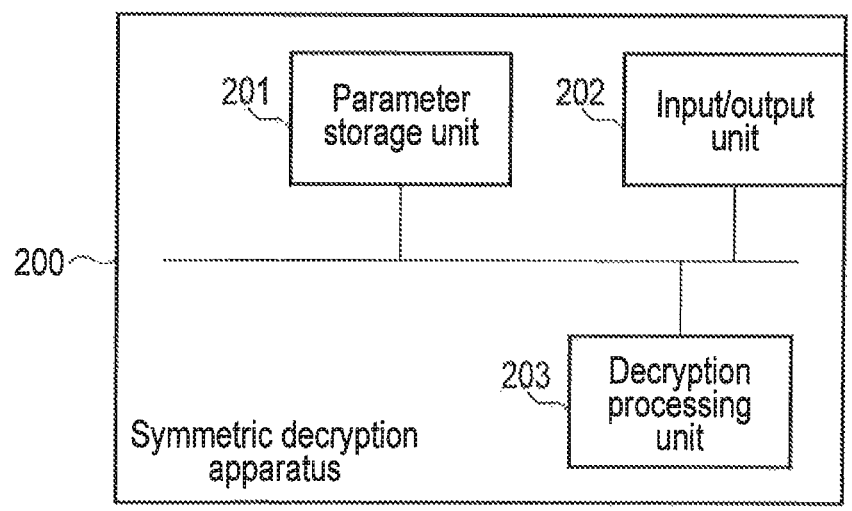
FIG. 2 is a is a block diagram schematically showing the arrangement of a symmetric decryption apparatus according to the first embodiment.

FIG. 1 is a block diagram showing the arrangement of a symmetric encryption apparatus according to the first embodiment. FIG. 2 is a block diagram showing the arrangement of a symmetric decryption apparatus according to the first embodiment.

A symmetric encryption apparatus 100 includes a parameter storage unit 101, an input/output unit 102, and an encryption processing unit 103.

The parameter storage unit (storage unit) 101 is a memory readable by the encryption processing unit 103, and stores the secret key sk (symmetric key) formed from the plurality of elements $(s_1, \ldots, s_n)$ of the first polynomial ring S, and security parameters. The parameter storage unit 101 may store information of the commutative ring R and polynomial ring S. The parameter storage unit 101 may also store information of the encoding processing Ecd.

The input/output unit 102 accepts the input of the plaintext msg (plaintext information) of a document to be encrypted, and outputs the ciphertext $c(x_1, \ldots, x_n)$ calculated by the encryption processing unit 103. The input/output unit 102 constitutes a plaintext acceptance unit and an output unit.

The encryption processing unit 103 calculates the ciphertext $c(x_1, \ldots, x_n)$ based on the plaintext msg whose input has been accepted by the input/output unit 102 and the information stored in the parameter storage unit 101.

For example, the encryption processing unit 103 has functions (f103-1) to (f103-3) below.

(f103-1) A plaintext polynomial generation function of generating the plaintext polynomial e by embedding the plaintext msg whose input has been accepted in at least one of the terms of a polynomial in the subspace M of the first polynomial ring S.

Note that the plaintext polynomial generation function (f103-1) may have a function (f103-1-1) of additively dividing the plaintext msg into a plurality of pieces of partial information $msg_1, \ldots, msg_i, \ldots, msg_m$, and embedding the plurality of pieces of partial information $msg_1, \ldots, msg_i, \ldots, msg_m$ as the coefficients of the respective terms of the plaintext polynomial e. Note that m is a value that satisfies m≤dw−1 for the above-described degrees d and w.

(f103-2) A mask polynomial generation function of generating a mask polynomial $g(x_1, \ldots, x_n)$ having the secret key sk (symmetric key) as a solution based on the second commutative ring R defined over the first polynomial ring S.

(f103-3) A encryption function of generating the ciphertext $c(x_1, \ldots, x_n)$ using the plaintext polynomial e and the mask polynomial $g(x_1, \ldots, x_n)$.

The encryption processing unit 103 may have a function (f103-4) below.

(f103-4) A homomorphic calculation function of, when the plaintext polynomial generation function (f103-1), the mask polynomial generation function (f103-2), and the encryption function (f103-3) separately generate two ciphertexts $c^{(1)}(x_1, \ldots, x_n)$ and $c^{(2)}(x_1, \ldots, x_n)$ from two plaintext polynomials $e^{(1)}$ and $e^{(2)}$, generating a new ciphertext $c^{(hom)}(x_1, \ldots, x_n)$ by homomorphic calculation processing of adding or multiplying the two ciphertexts.

When the two ciphertexts are added, the result of decrypting the new ciphertext $c^{(hom)}(x_1, \ldots, x_n)$ based on the secret key sk is equal to the result of adding the two plaintext polynomials $e^{(1)}$ and $e^{(2)}$.

Alternatively, when the two ciphertexts are multiplied, the result of decrypting the new ciphertext $c^{(hom)}(x_1, \ldots, x_n)$ based on the secret key sk is equal to the result of multiplying the two plaintext polynomials $e^{(1)}$ and $e^{(2)}$.

The encryption processing unit 103 constitutes a plaintext polynomial generation unit, a mask polynomial generation unit, and an encryption unit. The encryption processing unit 103 may also constitute a homomorphic calculation unit.

On the other hand, as shown in FIG. 2, a symmetric decryption apparatus 200 includes a parameter storage unit 201, an input/output unit 202, and a decryption processing unit 203.

The parameter storage unit (storage unit) 201 is a memory readable by the decryption processing unit 203, and stores the secret key sk (symmetric key) formed from the plurality of elements $(s_1, \ldots, s_n)$ of the polynomial ring S, and security parameters. The parameter storage unit 201 may store information of the commutative ring R and polynomial ring S. The parameter storage unit 201 may also store information of the decoding processing Dcd.

The input/output unit 202 accepts the input of the ciphertext $c(x_1, \ldots, x_n)$, and outputs the decryption result msg'. The input/output unit 202 constitutes a ciphertext acceptance unit and an output unit.

The ciphertext $c(x_1, \ldots, x_n)$ has been generated using the plaintext polynomial e and the mask polynomial $g(x_1, \ldots, x_n)$.

The plaintext polynomial e has been generated by embedding the plaintext msg in at least one of the terms of a polynomial in the subspace M of the first polynomial ring S. Note that the plaintext msg may be additively divided into a plurality of pieces of partial information, and the plurality of pieces of partial information may be embedded as coefficients in the respective terms of the plaintext polynomial e. In this case, a decryption function (f203-2) (to be described later) can extract, as a plurality of pieces of partial information, the coefficients of the respective terms of the plaintext polynomial e decrypted by a plaintext polynomial decryption function (f203-1), and calculate the total sum of the plurality of pieces of partial information, thereby performing decryption into the plaintext msg.

The mask polynomial $g(x_1, \ldots, x_n)$ has the secret key sk as a solution. The mask polynomial $g(x_1, \ldots, x_n)$ has been generated based on the second commutative ring R defined over the first polynomial ring S.

The decryption processing unit 203 decrypts the ciphertext $c(x_1, \ldots, x_n)$ based on the ciphertext $c(x_1, \ldots, x_n)$ whose input has been accepted by the input/output unit 202 and the information stored in the parameter storage unit 201, thereby obtaining the decryption result msg'.

For example, the decryption processing unit 203 has the following functions (f203-1) and (f203-2).

(f203-1) The plaintext polynomial decryption function of decrypting the ciphertext $c(x_1, \ldots, x_n)$ into the plaintext polynomial e based on the secret key sk in the parameter storage unit 201.

(f203-2) The decryption function of decrypting the decrypted plaintext polynomial e into the plaintext msg.

Note that a case in which the ciphertext whose input has been accepted has been generated by homomorphic calculation processing of adding or multiplying the two ciphertexts $c^{(1)}(x_1, \ldots, x_n)$ and $c^{(2)}(x_1, \ldots, x_n)$ separately generated from the two plaintext polynomials $e^{(1)}$ and $e^{(2)}$ will be described.

When the two ciphertexts are added, the decryption result of the decryption function (f203-2) is equal to the result of adding the two plaintext polynomials $e^{(1)}$ and $e^{(2)}$.

Alternatively, when the two ciphertexts are multiplied, the decryption result of the decryption function (f203-2) is equal to the result of multiplying the two plaintext polynomials $e^{(1)}$ and $e^{(2)}$.

The decryption processing unit 203 constitutes a plaintext polynomial decryption unit and a decryption unit.

The operations of the symmetric encryption apparatus and symmetric decryption apparatus which have the above-described arrangements will be described with reference to flowcharts shown in FIGS. 3 and 4, respectively.

As shown in FIG. 3, in the symmetric encryption apparatus 100, the input/output unit 102 accepts the input of the plaintext msg (step ST1). The parameters (for example, S, R, sk, and the like) in the parameter storage unit 101 are read out by the encryption processing unit 103, as needed.

The encryption processing unit 103 executes encoding processing to embed the plaintext msg whose input has been accepted by the input/output unit 102 in each term of the polynomial in the subspace M of the polynomial ring S, thereby calculating the plaintext polynomial e=Ecd(msg) (step ST2).

The encryption processing unit 103 generates the mask polynomial $g(x_1, \ldots, x_n)$ having the secret key $(s_1, \ldots, s_n)$ as a solution based on the commutative ring R defined over the polynomial ring S. For example, the encryption processing unit 103 randomly selects the mask polynomial $g(x_1, \ldots, x_n)$ from the commutative ring R (steps ST3 to ST5). Note that the mask polynomial $g(x_1, \ldots, x_n)$ is added to the plaintext polynomial e, thereby concealing the plaintext polynomial e.

More specifically, for example, the encryption processing unit 103 randomly selects the polynomial $f(x_1, \ldots, x_n)$ from the commutative ring R (step ST3). The polynomial $f(x_1, \ldots, x_n)$ may be referred to as a random polynomial $f(x_1, \ldots, x_n)$.

The encryption processing unit 103 calculates the polynomial $f(s_1, \ldots, s_n)$ obtained by substituting the secret key sk for the variables $x_1, \ldots, x_n$ of the polynomial $f(x_1, \ldots, x_n)$ (step ST4), and sets the mask polynomial $g(x_1, \ldots, x_n) = f(x_1, \ldots, x_n) - f(s_1, \ldots, s_n)$ (step ST5).

Note that + represents addition defined by the commutative ring R, and − represents addition of an additive inverse.

The mask polynomial $g(x_1, \ldots, x_n)$ and polynomial $f(x_1, \ldots, x_n)$ may be selected from a subset of the commutative ring R instead of the commutative ring R.

Alternatively, the mask polynomial $g(x_1, \ldots, x_n)$ and polynomial $f(x_1, \ldots, x_n)$ may be selected depending on the date/time when encryption is processed, the secret key sk, or the plaintext msg, instead of being randomly selected. Steps ST3 to ST5 may be executed before the execution of step ST1.

The encryption processing unit 103 generates the ciphertext $c(x_1, \ldots, x_n) = e + g(x_1, \ldots, x_n)$ by adding the plaintext polynomial e and the mask polynomial $g(x_1, \ldots, x_n)$ (step ST6).

The symmetric encryption apparatus 100 outputs the ciphertext $c(x_1, \ldots, x_n)$ from the input/output unit 102 (step ST7).

The operation of the symmetric encryption apparatus 100 has been explained above. The operation of the symmetric decryption apparatus 200 will be described next.

Figure 4:
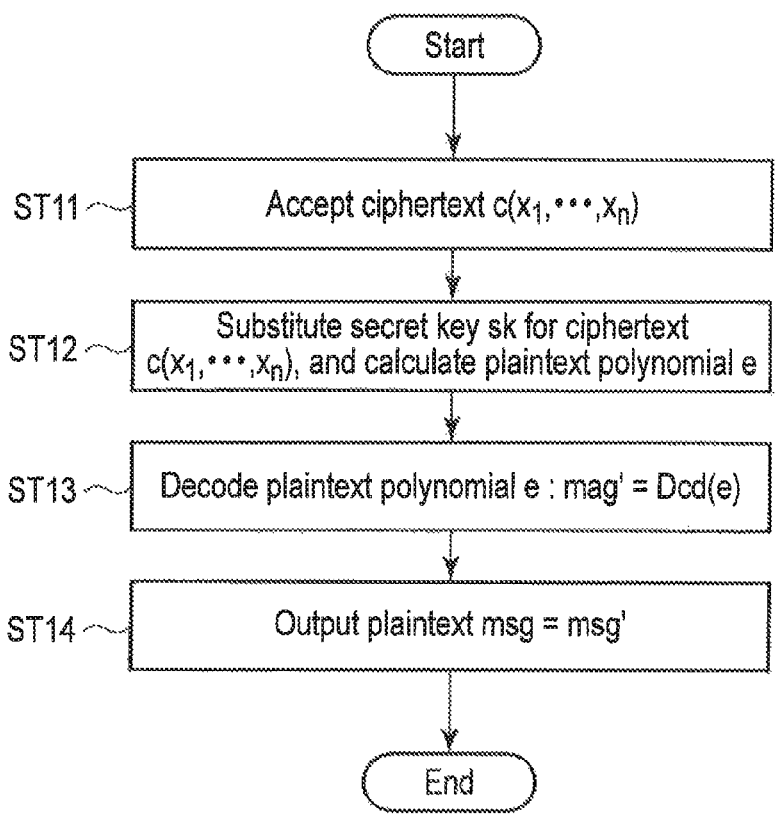
FIG. 4 is a flowchart for explaining decryption processing according to the first embodiment.

In the symmetric decryption apparatus 200, as shown in FIG. 4, the input/output unit 202 accepts the input of the ciphertext $c(x_1, \ldots, x_n)$ (step ST11).

The decryption processing unit 203 decrypts the ciphertext $c(x_1, \ldots, x_n)$ into the plaintext polynomial e based on the secret key $sk = (s_1, \ldots, s_n)$ in the parameter storage unit 201. For example, the decryption processing unit 203 substitutes the secret key $sk = (s_1, \ldots, s_n)$ for the ciphertext $c(x_1, \ldots, x_n)$, and calculates the plaintext polynomial e (step ST12), as given by:

$$c(s_1, \ldots, s_n) = e + g(s_1, \ldots, s) = e$$

The decryption processing unit 203 decrypts the decrypted plaintext polynomial e into the plaintext msg. That is, the decryption processing unit 203 decodes the plaintext polynomial e, and calculates the decryption result $msg' = Dcd(e)$ (step ST13).

As described above, for example, when the polynomial ring is represented by $S = A[t_1, \ldots, t_n]$ and the encoding processing is represented by $Ecd(msg) = e = \Sigma msg_i t_i$ where the plaintext $msg = msg_1 \| msg_2 \| \ldots \| msg_n$, the polynomial $c(s_1, \ldots, s_n)$ calculated in step ST12 is the plaintext polynomial $e = \Sigma msg_i t_i$ with a variable $t_i$.

In this case, according to the plaintext polynomial $e = \Sigma msg_i t_i$, it is possible to perform decryption into the plaintext $msg = msg'$ by assigning the coefficient of the variable $t_i$ to the bit string $msg'_i$ of the plaintext, and setting the decryption result $msg' = msg'_1 \| msg'_2 \| \ldots \| msg'_n$.

Alternatively, when the polynomial ring is represented by $S = F_q[t]$ and the encoding processing is represented by $Ecd(msg) = e = \Sigma msg_i t^i$ where the plaintext $msg = msg_1 \| msg_2 \| \ldots \| msg_m$, the polynomial $c(s_1, \ldots, s_n)$ calculated in step ST12 is the plaintext polynomial $e = \Sigma msg_i t^i$ with the variable t.

In this case, according to the plaintext polynomial $e = \Sigma msg_i t^i$, it is possible to perform decryption into the plaintext $msg = msg'$ by assigning the coefficient of the variable $t^i$ to the bit string $msg'_i$ of the plaintext, and setting the decryption result $msg' = msg'_1 \| msg'_2 \| \ldots \| msg'_n$.

When the polynomial ring is represented by $S = F_q[t]$ and the encoding processing is represented by $Ecd(msg) = e = \Sigma msg_i t^i$ where the plaintext $msg = \Sigma msg_i l_i$, the polynomial $c(s_1, \ldots, s_n)$ calculated in step ST12 is the plaintext polynomial $e = \Sigma msg_i t^i$ with the variable t.

In this case, according to the plaintext polynomial $e = \Sigma msg_i t^i$, it is possible to perform decryption into the plaintext $msg = msg'$ by assigning the coefficient of the variable $t^i$ to the bit string $msg'_i$, and setting the decryption result $msg' = \Sigma msg_i l_i$.

Finally, the symmetric decryption apparatus 200 outputs the plaintext $msg = msg'$ from the input/output unit 202 (step ST14).

According to this embodiment, as described above, with the arrangement in which the ciphertext $c(x_1, \ldots, x_n)$ is generated by processing of generating the plaintext polynomial e by embedding the plaintext msg in each term of the polynomial in the subspace M of the polynomial ring S, and adding the plaintext polynomial e and the mask polynomial $g(x_1, \ldots, x_n)$ having the symmetric key (sk) as a solution, it is possible to increase the parallelism and improve the calculation efficiency. Note that in processing of adding polynomials, processing of adding the coefficients of similar terms can be executed in parallel. Therefore, in this embodiment, it is possible to increase the parallelism in processing of adding the plaintext polynomial e and the mask polynomial $g(x_1, \ldots, x_n)$. Furthermore, according to this embodiment, it is also possible to increase the parallelism from the viewpoint that processing of embedding the plaintext msg in each term of the polynomial can be executed in parallel.

According to this embodiment, with the arrangement in which when the input of the thus generated ciphertext $c(x_1, \ldots, x_n)$ is accepted, the ciphertext $c(x_1, \ldots, x_n)$ is decrypted into the plaintext polynomial e based on the symmetric key (sk), and the decrypted plaintext polynomial e is decrypted into the plaintext msg, it is possible to increase the parallelism and improve the calculation efficiency. Note that in processing of decrypting the ciphertext $c(x_1, \ldots, x_n)$ into the plaintext polynomial e based on the symmetric key (sk), for example, processing of performing decoding into part of the plaintext msg for each term of the polynomial, for example, processing of performing decoding into coefficients for each set of similar terms can be executed in parallel. According to this embodiment, therefore, it is possible to increase the parallelism in processing of decrypting the ciphertext $c(x_1, \ldots, x_n)$ into the plaintext polynomial e. Furthermore, according to this embodiment, it is possible to increase the parallelism from the viewpoint that processing of decrypting each term of the plaintext polynomial e into part of the plaintext msg can be executed in parallel.

The symmetric encryption apparatus 100 performs the encoding processing Ecd to associate the plaintext msg with a commutative ring having an element expressed by the sum of two or more bases. Therefore, it is possible to embed a multi precision plaintext in one ciphertext by embedding plaintext information in two or more bases of an element of M. It is thus possible to encrypt a plaintext with a size larger than the processing unit of a CPU without performing data processing with multi precision.

As the symmetric encryption scheme with full homomorphism, there is known a technique described in Michal Hojsik, Veronika Pulpanova, "A Fully Homomorphic Cryptosystem with Approximate Perfect Secrecy", CT-RSA 2013, pp. 375-388, LNCS 7779, Springer-Verlag (to be referred to as non-patent literature 1 hereinafter).

The technique described in non-patent literature 1, however, can embed only a single plaintext in one ciphertext since an integer value of $F_p = \{0, 1, \ldots, p-1\}$ is calculated in decryption. In the technique described in non-patent literature 1, therefore, it is necessary to execute data processing with multi precision to perform encryption processing for a plaintext with a size larger than the processing unit of the CPU. Furthermore, in the technique described in non-patent literature 1, it is necessary to calculate a plurality of ciphertexts to encrypt a plurality of plaintexts.

To the contrary, according to this embodiment, with the arrangement in which plaintext information is embedded in each term of a polynomial, it is possible to embed a multi precision plaintext or a plurality of plaintexts in one ciphertext.

<Modification 1 of First Embodiment: Extension Field>

In the first embodiment, the arrangement of the symmetric encryption apparatus in which M is a subset of the polynomial ring S has been explained. In Modification 1, a case in which the subset M of the polynomial ring S indicates a subset of a field L will be described. Assume that an extension field obtained by adjoining $\alpha$ to a field $F_p$ or K will be exemplified as the field L. However, an extension field obtained by adjoining $\alpha_1, \ldots, \alpha_{m'}$ to the field $F_p$ or K may be used. The former corresponds to the polynomial ring S=A[t] in the first embodiment, and the latter corresponds to the polynomial ring S=A[$t_1, \ldots, t_{m'}$] in the first embodiment.

The arrangement of the symmetric encryption apparatus for implementing Modification 1 is the same as that of the symmetric encryption apparatus 100 described above.

Notation for explaining Modification 1 will be described next.

In the first embodiment, S represents the polynomial ring with the variable $t_i$. In Modification 1, S∪L represents a sub field of an extension field of degree m, L={$\Sigma_{0 \leq i \leq m-1} c_i \alpha^i | C_i \in F_p$ where $\alpha$ represents the root of an irreducible polynomial of degree m with $F_p$ as a coefficient and m≥2}, of the field $F_p$={0, 1, ..., p−1}. Alternatively, the sub field S may be an extension field of an arbitrary field K different from the field $F_p$.

The commutative ring R=S[$x_1, \ldots, x_n$] is a polynomial ring having the elements of the sub field S as coefficients.

The secret key sk is, for example, a set sk=($s_1, \ldots, s_m$) of the elements of the sub field S where $s_i = \Sigma_{0 \leq j \leq m-1} c_j \alpha^i$ is an element of the sub field S.

The encoding processing assigns the plaintext msg to an element of the subset M of the sub field S. The above-described base corresponds to each $c_i \alpha^i$ of $\Sigma c_i \alpha^i$ as an element of the subset M.

For example, when the secret key is represented by sk=($s_1, \ldots, s_n$)∈S$''$ and the commutative ring is represented by R=S[$x_1, \ldots, x_n$], the encoding processing Ecd may divide the plaintext msg into m bit strings $msg_1 \| msg_2 \| \ldots \| msg_m$ (where $\|$ represents bit concatenation) by representing the plaintext by bits, thereby outputting a plaintext polynomial e=$\Sigma msg_i \alpha^{i-1}$.

At this time, similarly to the first embodiment, the decoding processing Dcd(sk, e) can concatenate the m bit strings $msg_1, msg_2, \ldots, msg_m$, thereby performing decoding into the plaintext msg, as given by:

$$msg_1 \| msg_2 \| \ldots \| msg_m = msg$$

Alternatively, the plaintext msg may undergo l-adic expansion (for example, l=$2^{16}$=65536), and each digit may be associated with the bit string $msg_i$. At this time, the decoding processing performs decoding into the plaintext msg by converting a value obtained by performing l-adic expansion into a predetermined format such as a binary or decimal number.

Furthermore, encoding processing may stochastically be calculated for the plaintext msg by setting some of the bit strings $msg_i$ to random integers $rnd_i$.

At this time, the decoding processing extracts the bit strings $msg_i$ except for the random integers $rnd_i$, and performs decoding into the plaintext msg.

An index i indicating a position where the random integer $rnd_i$ is used instead of the bit string $msg_i$ (that is, an actual index j of a bit string $msg_j$ in which the plaintext msg is embedded) may be a public parameter in the system, or secret information between communication parties sharing a symmetric key.

The processes of the symmetric encryption apparatus and symmetric decryption apparatus according to Modification 1 are the same as those of the symmetric encryption apparatus 100 and symmetric decryption apparatus 200 described above. More specifically, the processing of each apparatus is obtained by substituting $\alpha^i_j$ for $t^i_j$ in the first embodiment and a detailed description thereof will be omitted.

According to Modification 1, as described above, even if the subset M of the polynomial S is a subset of the field L, it is possible to obtain the same effects by implementing the first embodiment in the same manner.

<Modification 2 of First Embodiment: Homomorphic Calculation>

In the first embodiment and Modification 1, the arrangement of the symmetric encryption apparatus has been explained. In the first embodiment and Modification 1, when encoding satisfies Ecd($msg^{(1)}$)+Ecd($msg^{(2)}$)=Ecd($msg^{(1)}$+$msg^{(2)}$) or Ecd($msg^{(1)}$)*Ecd($msg^{(2)}$)=Ecd($msg^{(1)}$)*$msg^{(2)}$), the symmetric encryption apparatus with homomorphism can be configured.

As encoding satisfying such characteristic, there is provided a method of dividing the plaintext msg into the bit strings $msg_1 \| msg_2 \| \ldots \| msg_m$ to obtain Ecd(msg)=e=$\Sigma msg_i x_n^{i-1}$ or Ecd(msg)=e=$\Sigma msg_i \alpha^{i-1}$, as described above.

The plaintext msg may undergo l-adic expansion as $\Sigma msg_{(1)i} l^i$ to obtain the plaintext polynomial e=Ecd(msg)=$\Sigma msg_{(1)i} x_i$.

Alternatively, an encoding result may stochastically be calculated for the plaintext msg by setting some of the above-described bit strings $msg_i$ to random integers $rnd_i$, thereby obtaining Ecd(msg)=e=$\Sigma_{1 \leq i} rnd_i x_n^{i-1}$+msg or Ecd(msg)=e=$\Sigma_{1 \leq i} rnd_i \alpha^{i-1}$+msg.

The arrangement of a symmetric encryption apparatus according to Modification 2 is the same as that of the above-described symmetric encryption apparatus 100, and only an encoding method is different. Homomorphic calculation processing executed by the symmetric encryption apparatus of Modification 2 will be described below.

Figure 5:
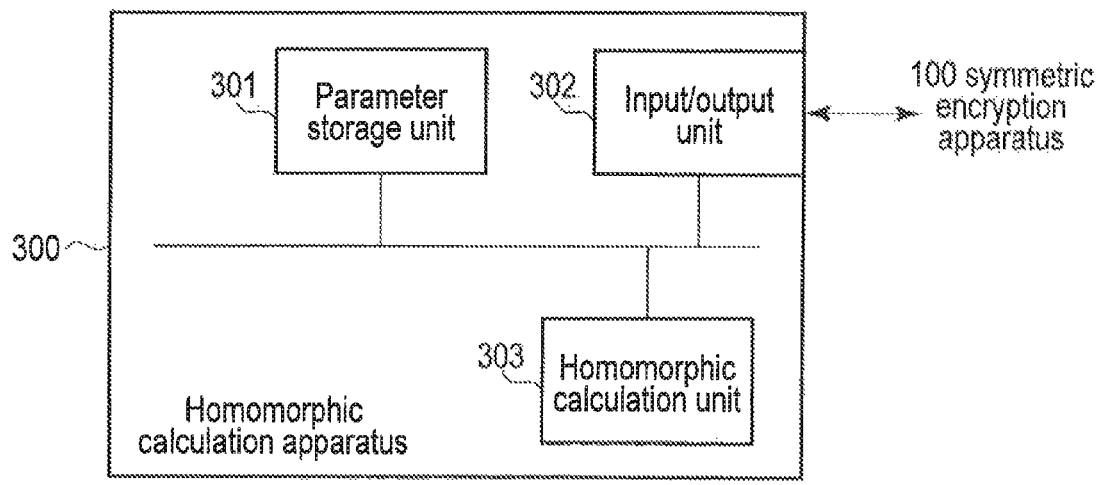
FIG. 5 is a block diagram schematically showing the arrangement of a homomorphic calculation apparatus used in Modification 2 of the first embodiment.

FIG. 5 is a block diagram showing the arrangement of a homomorphic calculation apparatus used in Modification 2 of the first embodiment. A homomorphic calculation apparatus 300 includes a parameter storage unit 301, an input/output unit 302, and a homomorphic calculation unit 303.

The parameter storage unit 301 stores security parameters. The parameter storage unit 301 may store information of the commutative ring R and polynomial ring S. The parameter storage unit 301 may also store information of the encoding processing Ecd.

The input/output unit 302 accepts the input of the two ciphertexts $c^{(1)}(x_2, \ldots, x_n)$ and $c^{(2)}(x_1, \ldots, x_n)$ from the symmetric encryption apparatus 100, and outputs the homomorphic calculation result $c^{(hom)}(x_1, \ldots, x_n)$ to the symmetric encryption apparatus 100.

The homomorphic calculation unit 303 calculates the homomorphic calculation result $c^{(hom)}(x_1, \ldots, x_n)$ based on the ciphertexts $c^{(1)}(x_1, \ldots, x_n)$ and $c^{(2)}(x_1, \ldots, x_n)$ accepted by the input/output unit 302 and the information stored in the parameter storage unit 301.

Note that the above-described symmetric encryption apparatus 100 may further include the function of the homomorphic calculation apparatus 300.

Figure 6:
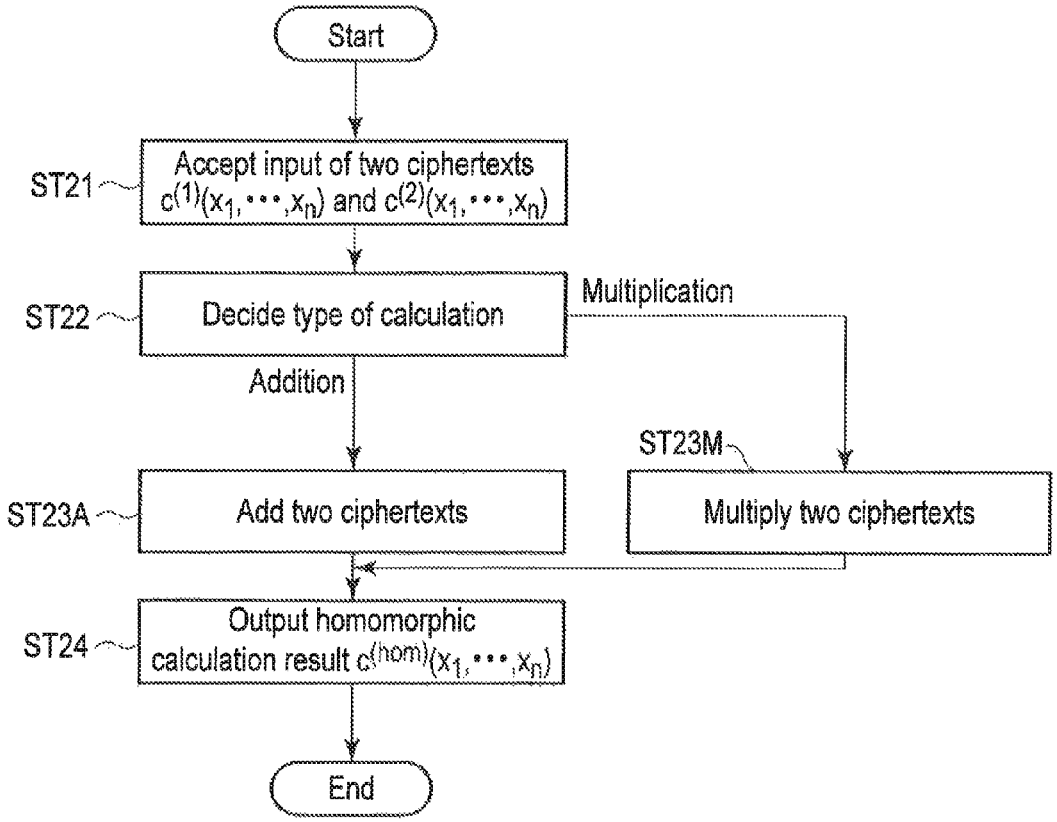
FIG. 6 is a flowchart for explaining homomorphic calculation processing according to Modification 2.

The homomorphic calculation processing according to Modification 2 will be described with reference to FIG. 6.

The input/output unit 302 of the homomorphic calculation apparatus 300 accepts the input of the two ciphertexts $c^{(1)}(x_1, \ldots, x_n)$ and $c^{(2)}(x_1, \ldots, x_n)$ (step ST21). Note that the first ciphertext $c^{(1)}(x_1, \ldots, x_n)$ has been generated from the first plaintext polynomial $e^{(1)}$. The second ciphertext $c^{(2)}(x_1, \ldots, x_n)$ has been generated from the second plaintext polynomial $e^{(2)}$.

The homomorphic calculation apparatus 300 decides the type of calculation such as addition or multiplication for the two ciphertexts (step ST22). The calculation type may be decided in advance for the homomorphic calculation apparatus 300 or externally designated for the homomorphic calculation apparatus 300 when accepting the input of the ciphertexts $c^{(1)}(x_1, \ldots, x_n)$ and $c^{(2)}(x_1, \ldots, x_n)$.

When adding the two ciphertexts $c^{(1)}(x_1, \ldots, x_n)$ and $c^{(2)}(x_1, \ldots, x_n)$, the homomorphic calculation apparatus 300 generates a new ciphertext $c^{(Add)}(x_1, \ldots, x_n)$ by homomorphic calculation processing of adding the two ciphertexts (step ST23A), as given by:

$$c^{(Mul)}(x_1, \ldots, x_n) = c^{(1)}(x_1, \ldots, x_n) \star c^{(2)}(x_1, \ldots, x_n)$$
$$= e^{(1)} \star e^{(2)} + g^{(1)}(x_1, \ldots, x_n)g^{(2)}(x_1, \ldots, x_n) +$$
$$g^{(1)}(x_1, \ldots, x_n)e^{(2)} + g^{(2)}(x_1, \ldots, x_n)e^{(1)}$$

When multiplying the two ciphertexts, the homomorphic calculation apparatus 300 generates a new ciphertext $c^{(Mul)}(x_1, \ldots, x_n)$ by homomorphic calculation processing of multiplying the two ciphertexts (step ST23M), as given by:

$$c^{(Add)}(x_1, \ldots, x_n) = c^{(1)}(x_1, \ldots, x_n) + c^{(2)}(x_1, \ldots, x_n)$$
$$= e^{(1)} + e^{(2)} + g^{(1)}(x_1, \ldots, x_n) + g^{(2)}(x_1, \ldots, x_n)$$

The homomorphic calculation apparatus 300 outputs the homomorphic calculation result obtained in step ST23A or ST23M from the input/output unit 302 to the symmetric encryption apparatus 100 (step ST24).

After confirming that the ciphertext having undergone homomorphic calculation corresponds to the plaintext having undergone intended homomorphic calculation, the symmetric encryption apparatus 100 transmits the ciphertext to the symmetric decryption apparatus 200. Note that the symmetric decryption apparatus 200 may confirm this homomorphic calculation.

As for addition, the result of decrypting the new ciphertext $c^{(Add)}(x_1, \ldots, x_n)$ based on the secret key $sk(s_1, \ldots, s_n)$ is equal to the result of adding the two plaintext polynomials $e^{(1)}$ and $e^{(2)}$, as given by:

$$c^{(Add)}(s_1, \ldots, s_n) = c^{(1)}(s_1, \ldots, s_n) + c^{(2)}(s_1, \ldots, s_n)$$
$$= e^{(1)} + e^{(2)} + g^{(1)}(s_1, \ldots, s_n) + g^{(2)}(s_1, \ldots, s_n)$$
$$= e^{(1)} + e^{(2)}$$

That is, when the symmetric decryption apparatus 200 substitutes the secret key sk for the homomorphic calculation result $c^{(Add)}(x_1, \ldots, x_n)$, the sum $(e^{(1)}+e^{(2)})$ of the plaintext polynomials is correctly decrypted.

As for multiplication, the result of decrypting the new ciphertext $c^{(Mul)}(x_1, \ldots, x_n)$ based on the secret key $sk=(s_1, \ldots, s_n)$ is equal to the result of multiplying the two plaintext polynomials $e^{(1)}$ and $e^{(2)}$, as given by:

$$c^{(Mul)}(s_1, \ldots, s_n) = c^{(1)}(s_1, \ldots, s_n) \star c^{(2)}(s_1, \ldots, s_n)$$
$$= e^{(1)} \star e^{(2)} + g^{(1)}(s_1, \ldots, s_n)g^{(2)}(s_1, \ldots, s_n) +$$
$$g^{(1)}(s_1, \ldots, s_n)e^{(2)} + g^{(2)}(s_1, \ldots, s_n)e^{(1)}$$
$$= e^{(1)} \star e^{(2)}$$

Therefore, when the symmetric decryption apparatus 200 substitutes the secret key sk for the homomorphic calculation result $c^{(Mul)}(x_1, \ldots, x_n)$, the product $(e^{(1)} \ast e^{(2)})$ of the plaintext polynomials is correctly decrypted.

According to Modification 2, as described above, when the two ciphertexts $c^{(1)}(x_1, \ldots, x_n)$ and $c^{(2)}(x_1, \ldots, x_n)$ are separately generated from the two plaintext polynomials $e^{(1)}$ and $e^{(2)}$, homomorphic calculation processing of adding or multiplying the two ciphertexts is executed to generate a new ciphertext.

As for addition, since the result of decrypting the new ciphertext based on the symmetric key is equal to the result of adding the two plaintext polynomials, it is possible to implement additive homomorphic calculation.

As for multiplication, since the result of decrypting the new ciphertext based on the symmetric key is equal to the result of multiplying the two plaintext polynomials, it is possible to implement multiplicative homomorphic calculation.

According to Modification 2, since additive and multiplicative homomorphic calculations can be implemented, it is possible to implement fully homomorphic calculation in addition to the effects of the first embodiment.

(Other Modifications of First Embodiment: Encoding Processing Ecd)

In the above-described first embodiment and Modifications 1 and 2, encoding processes Ecd to be described in (1) to (7) below can be used.

(1) Encoding Processing in which Plaintext Msg is Divided into Bit Strings after 1-Adic Expansion A case in which the plaintext msg is represented by bit strings $msg_1 \| \ldots \| msg_m$ or 1-adic expansion $msg = \Sigma msg_i t^{i-1}$ and encoding processing is indicated by $Ecd(msg) = e = \Sigma msg_i t^{i-1}$ or $Ecd(msg) = e = \Sigma msg_i \alpha^{i-1}$ has been explained. Note that m is a value that satisfies $m \leq dw-1$ for the above-described degrees d and w.

The symmetric encryption scheme using the encoding processing Ecd satisfies homomorphism with respect to addition and multiplication.

(2) Encoding Processing in which No Plaintext Msg is Divided

Without dividing the plaintext msg, the plaintext msg may be set as one coefficient $c_0$ ($c_0$=msg), random numbers may be set as other m−1 coefficients $c_1, \ldots, c_{m-1}$, $Ecd(msg) = e = \Sigma c_i t^i$ or $Ecd(msg) = e = \Sigma c_i \alpha^i$ may be set as the encoding processing. Note that m is a value that satisfies $m \leq dw-1$ for the above-described degrees d and w.

When such encoding processing Ecd is used, the symmetric encryption scheme satisfies homomorphism with respect to addition and multiplication.

(3) Encoding Processing in which Plaintext Msg is Additively Divided

The encoding processing Ecd may be executed so as to additively divide the plaintext msg into the plurality of pieces of partial information $msg_1, \ldots, msg_i, \ldots, msg_m$, and embed the plurality of pieces of partial information $msg_1, \ldots, msg_i, \ldots, msg_m$ as the coefficients of the respective terms of the plaintext polynomial e. Note that m is a value that satisfies $m \leq dw-1$ for the above-described degrees d and w.

For example, the plaintext msg is additively divided like $msg=\Sigma msg_i$ or $msg=\Sigma msg_i \bmod p$ (p is an integer), and the encoding processing may be indicated by $Ecd(msg)=e=\Sigma msg_i t^{i-1}$ or $Ecd(msg)=e=\Sigma msg_i \alpha^{i-1}$. Note that the number of $msg_i$ obtained by additively dividing the plaintext msg is equal to or smaller than (dw−1) for the above-described degrees d and w.

The corresponding decoding processing Dcd may be executed so as to perform decryption into the plaintext msg by extracting the coefficients of the respective terms of the decrypted plaintext polynomial e as the plurality of pieces of partial information, and calculating the total sum of the plurality of pieces of partial information.

For example, the plaintext polynomial $e=\Sigma msg'_i t^{i-1}$ or the plaintext polynomial $e=\Sigma msg'_i \alpha^{i-1}$ is decrypted into the plaintext msg=msg' according to the decryption result $msg'=\Sigma msg'_i$ or the like. In the case of (3), only if all the pieces of partial information $msg'_i$ are correct, it is possible to perform decryption into the plaintext msg by calculating the total sum of the pieces of partial information $msg'_i$, unlike the case of (1). That is, in the case of (3), it is possible to obtain the same effects as in the case in which the pieces of partial information $msg_i$ of the plaintext msg are secretly shared, unlike the case of (1).

When such encoding processing Ecd is used, the symmetric encryption scheme satisfies homomorphism with respect to addition.

(4) Encoding Processing in which Plaintext Msg Serves as Solution

In addition to additively dividing the plaintext msg, the plaintext msg may undergo the encoding processing Ecd so that the plaintext msg serves as the solution of an equation derived from the coefficient $c_i$ of the polynomial $e=\Sigma c_i t^{i-1}$ or $e=\Sigma c_i \alpha^{i-1}$.

For example, in consideration of the simultaneous linear equations with two unknowns using variables x and y, the encoding processing Ecd may be performed by determining the coefficients $c_0$ to $c_5$ so that the solution of $c_0 x + c_1 y = c_2$ and $c_3 x + c_4 y = c_5$ is x=msg.

Alternatively, in consideration of a quadratic equation using a variable x, the encoding processing Ecd may be performed by determining the coefficients $c_0$ to $c_2$ so that the solution of $c_0 + c_1 x + c_2 x^2 = 0$ is x=msg. In this case, since two solutions are derived from the equation, the equation may have the plaintext msg as a multiple root so as to maintain unique decodability.

Alternatively, the coefficients $c_0$ to $c_2$ may be determined so that the other solution is a value larger (or smaller) than the plaintext msg, and a smaller (or larger) value may be selected as the plaintext msg after solving the quadratic equation.

(5) Encoding Processing into Commutative Ring

A space where the plaintext msg is encoded is not limited to the subspace M of S, and a subspace of the polynomial ring $S[x_1, \ldots, x_n]$ may be set. At this time, an encoding result is the polynomial $e(x_1, \ldots, x_n)$ having the variables $x_1, \ldots, x_n$.

For example, the secret key $sk=(s_1, \ldots, s_n)$ and $\deg_t s_i > \Sigma_{i>j \geq 0} \deg_t s_j$ can be set, and the encoding processing can be indicated by $Ecd(msg)=msg_{1,1,\ldots,1} x_1 x_2 \ldots x_n + msg_{0,1,\ldots,1} x_2 \ldots x_n + \ldots + msg_{0,0,\ldots,1} x_n + msg_{0,0,\ldots,0}$.

Note that $\deg_t s_i$ represents a degree with respect to t of the polynomial $s_i$.

Assume that the plaintext msg is indicated by $msg = msg_{1,1,\ldots,1} \| msg_{0,1,\ldots,1} \| \ldots \| msg_{0,0\ldots 0}$.

In the decoding processing Dcd of the decryption processing, the secret key sk is substituted for the ciphertext $c(x_1, \ldots, x_n)$, and the plaintext polynomial $e(s_1, \ldots, s_n)$ is calculated, as given by:

$$c(s_1, \ldots, s_n) = e(s_1, \ldots, s_n)$$

The bit string $msg_{1,1,\ldots,1}$ is decoded from the coefficient of the highest degree with respect to t of the obtained plaintext polynomial $e(s_1, \ldots, s_n)$.

The bit string $msg_{0,1,\ldots,1}$ is decoded from the coefficient of the highest degree of the plaintext polynomial $e(s_1, \ldots, s_n) - msg_{1,1,\ldots,1} s_1 s_2 \ldots s_n$.

Similarly, it is possible to subsequently decode the respective bit strings $msg_{0,0,\ldots,1}, \ldots, msg_{0,0,\ldots,0}$, thereby decoding the respective bit strings into the plaintext $msg = msg_{1,1,\ldots,1} \| msg_{0,1,\ldots,1} \| \ldots \| msg_{0,0,\ldots,0}$.

(6) Encoding Processing for Plural Types of Plaintexts

The encoding processing Ecd may convert not only a single plaintext msg but also plural types of plaintexts $msg^{(1)}, \ldots, msg^{(m)}$ such as a height and weight into elements in the subspace M.

In this case, the encoding processing Ecd may be indicated by, for example, $Ecd(msg^{(1)}, \ldots, msg^{(m)}) = e = \Sigma msg^{(i)} t^{i-1}$ or $Ecd(msg^{(1)}, \ldots, msg^{(m)}) = e = \Sigma msg^{(i)} \alpha^{i-1}$. Note that the number of $msg^{(i)}$ to be encoded is equal to or smaller than (dw−1) for the above-described degrees d and w.

When the encoding processing Ecd is used, the symmetric encryption scheme satisfies homomorphism with respect to addition for each type of plaintext msg (for example, each msg when a height is assigned to $msg^{(1)}$ and a weight is assigned to $msg^{(2)}$).

Furthermore, as described above, the plaintext $msg^{(i)}$ may be divided into bit strings $msg^{(i)}_1 \| \ldots \| msg^{(i)}_m$, and the encoding processing may be indicated by $Ecd(msg^{(1)}), \ldots, msg^{(m)}) = e = \Sigma msg^{(i)}_j t^{m*i+j-1}$ or $Ecd(msg^{(1)}, \ldots, msg^{(m)}) = e = \Sigma msg^{(i)}_j \alpha^{m*i+j-1}$.

When the symmetric encryption scheme is required to have homomorphism with respect to multiplication, information indicating ciphertexts based on which a ciphertext multiplication result is obtained may leak by factorizing the ciphertext multiplication result.

To solve this problem, an element in the subspace M may be added to the ciphertext multiplication result to the extent that the homomorphism of multiplication does not deteriorate.

For example, when the subspace M is a subset of the polynomial ring $S=A[t]$, the encoding processing $Ecd(msg)=e=\Sigma c_i t^i$ of setting the coefficient $c_0=msg$ and setting random numbers in other coefficients $c_1, \ldots, c_{m-1}$ is assumed to be used.

In this case, of the ciphertext multiplication result, a term which influences the homomorphism of multiplication is a constant term ($t^0$), and terms $t, \ldots, t^{2(m-1)}$ have no influence on the homomorphism of multiplication. Therefore, a random polynomial $\Sigma c_i t^i$ may be generated by setting the coefficient $c0=0$ and randomly setting the coefficients $c_1, \ldots, c_{2(m-1)}$, and then added to the ciphertext multiplication result. The random polynomial $\Sigma c_i t^i$ may be called a mask polynomial.

(7) Encoding Processing for Updating Symmetric Key

The encoding processing Ecd converts the plaintext msg into an element (polynomial) of the subset M of the polynomial ring S. Instead of the above-described $msg_i$ and $rnd_i$, the element may be used as information $ks_i$ for updating the symmetric key. The transmitter and receiver update a symmetric key $sk_j$ based on $ks_i$ according to a predetermined procedure.

The method of encoding processing is not limited to those described in (1) to (7), and a combination of two or more of the methods may be used.

In the above-described first embodiment and modifications, encryption processing is performed according to $c(x_1, \ldots, x_n) = g(x_1, \ldots, x_n) + e$ using the mask polynomial $g(x_1, \ldots, x_n)$ having the secret key sk as a solution. At this time, encryption processing may be calculated as $c(x_1, \ldots, x_n) = [g(x_1, \ldots, x_n) + D]*e$ using a reversible element (for example, D=1) in the subspace M where "*" represents multiplication in R. In this case, the secret key sk may be input to the ciphertext $c(x_1, \ldots, x_n)$ to calculate $c(s_1, \ldots, s_n) = [g(s_1, \ldots, s_n) + D]*e = D*e$, thereby calculating e by dividing $D*e$ by D.

<Overview of Second Embodiment>

The overview of the second embodiment will be described.

In the first embodiment, the arrangement of the symmetric encryption apparatus using the elements of the commutative rings R and S has been explained.

In the second embodiment, an algebraic surface polynomial X(x, y) and its section $(u_x(t), u_y(t))$ are used as the mask polynomial $g(x_1, \ldots, x_n)$ and the secret key $sk = (s_1, \ldots, s_n)$ in the first embodiment. The mask polynomial $g(x_1, \ldots, x_n)$ is an algebraic surface polynomial X(x, y) representing an algebraic surface defined over the polynomial ring S. The algebraic surface is a zero set represented by the algebraic surface polynomial X(x, y) having two variables x and y, and a curve obtained by parameterizing x and y by t exists. The secret key (symmetric key) sk is a section polynomial $(u_x(t), u_y(t))$ of degree d representing the curve.

More specifically, $F_q = \{0, 1, 2, \ldots, q-1\}$ represents a finite field of q elements. A space in which a one-variable polynomial with a variable t exists and which is defined over the finite field $F_q$ of q elements is represented by $F_q[t]$.

The algebraic surface over the space $F_q[t] = \{\Sigma c_i t^i | c_i \in F_q\}$ is a zero set represented by a two-variable polynomial X(x, y) $\in (F_q[t])[x, y]$ of degree w with respect to x and y. An algebraic curve $(u_x(t), u_y(t)) \in (F_q[t])^2$ satisfying $X(u_x(t), u_y(t)) = 0$ is called the section of the algebraic surface polynomial X(x, y) = 0. Note that $u_x(t)$ and $u_y(t)$ represent polynomials obtained by parameterizing x and y by t, respectively.

When the algebraic curve $(u_x(t), u_y(t))$ is given, it is easy to configure the algebraic surface polynomial X(x, y)=0 having the algebraic curve $(u_x(t), u_y(t))$ as a section. However, there is unknown a method of, when the algebraic surface polynomial X(x, y)=0 is given, obtaining the section $(u_x(t), u_y(t))$ of the algebraic surface polynomial X(x, y)=0, except for specific X(x, y). In the second embodiment, the section of the algebraic surface is used as a secret key sk for the symmetric encryption scheme.

In notation according to the second embodiment, it can be considered that the space $F_q[t]$, the space $(F_q[t])[x, y]$, the algebraic surface polynomial X(x, y), the ciphertext c(x, y), and the section $(u_x(t), u_y(t))$ are set as the polynomial ring S, the commutative ring R, the mask polynomial $g(x_1, \ldots, x_n)$, the ciphertext $(x_1, \ldots, x_n)$, and the secret key sk in the first embodiment. Note that the field also serves as a ring, the finite field $F_q$ of q elements includes the polynomial ring S and the commutative ring R.

Alternatively, in notation according to the second embodiment, a space $F_q[x, y, t]$, algebraic surface polynomial X(x, y, t) $\in F_q[x, y, t]$, and ciphertext c(x, y, t) $\in F_q[x, y, t]$ can be regarded as the commutative ring R, the algebraic surface polynomial X(x, y) $\in (F_q[t])[x, y]$, and ciphertext $c(x_1, \ldots, x_n) \in (F_q[t]) [x, y]$ in the first embodiment.

Unless misunderstood, the former notation will be used below.

The finite field $F_q$ of q elements and the order q may be public parameters in a system, or secret information between communication parties sharing a symmetric key.

Notation for explaining the second embodiment will be described in detail.

The secret key sk is formed from two elements $(u_x(t), u_y(t))$ of $F_q[t]$.

In the second embodiment, a plaintext msg is encoded to an element of a subset M of $F_q[t]$ by encoding processing Ecd. The encoding processing from the plaintext msg to an element e of the subset M is represented by e=Ecd(msg).

On the other hand, decoding processing from the element e of the subset M to a decoding result msg' is represented by msg'=Dcd(e).

The encoding processing Ecd or decoding processing Dcd may accept the secret key sk as an input in addition to the plaintext msg or element e, thereby calculating e=Ecd(sk, msg) or msg'=Dcd(sk, e). The encoding processing Ecd and decoding processing Dcd are designed to obtain the plaintext msg=Dcd(Ecd(msg)) (the secret key sk is added as an input to the encoding processing Ecd and decoding processing Dcd, as needed).

For example, the encoding processing Ecd may divide the plaintext msg into n bit strings $msg_1 \| msg_2 \| \ldots \| msg_n$ (where $\|$ represents bit concatenation) by representing the plaintext by bits, thereby outputting a plaintext polynomial $e = \Sigma msg_i t^{i-1}$. Note that n is a value that satisfies $n \leq dw-1$ for the above-described degrees d and w. In this case, the decoding processing Dcd(sk, e) can extract n bit strings $msg_1 \| msg_2 \| \ldots \| msg_n$ from the plaintext polynomial e, thereby performing decoding into the plaintext $msg = msg_1 \| msg_2 \| \ldots \| msg_n$.

Alternatively, the plaintext msg may undergo l-adic expansion (for example, $l = 2^{16} = 65536$), and each digit may be associated with each bit string $msg_i$. At this time, decoding processing performs decoding into the plaintext msg by converting a value obtained by performing l-adic expansion into a predetermined format such as a binary or decimal number.

Although a case in which encoding processing is certainly calculated for the plaintext msg has been described above, encoding processing may stochastically be calculated for the plaintext msg by setting some of the bit strings $msg_i$ to random integers $rnd_i$. At this time, the decoding processing extracts each bit string $msg_i$ except for the random integers $rnd_i$, and performs decoding into the plaintext msg.

The encoding processing Ecd and decoding processing Dcd may be public parameters in the system, or secret information between communication parties sharing a symmetric key.

<Practical Arrangement of Second Embodiment>

The second embodiment will be described in detail below.

Figure 7:
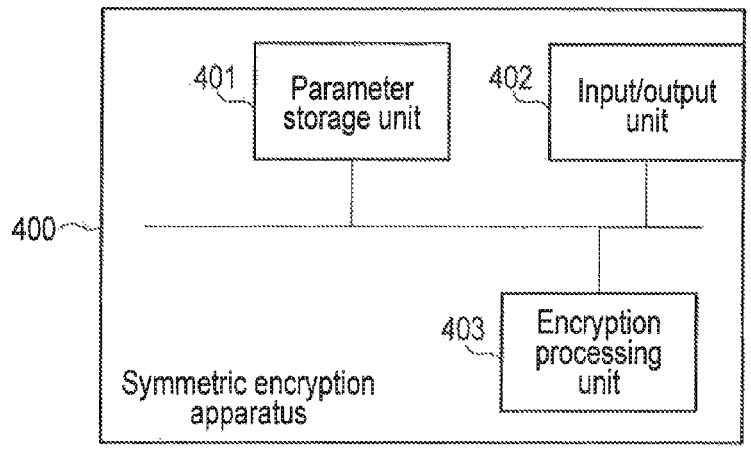
FIG. 7 is a block diagram schematically showing the arrangement of a symmetric encryption apparatus according to the second embodiment.
Figure 8:
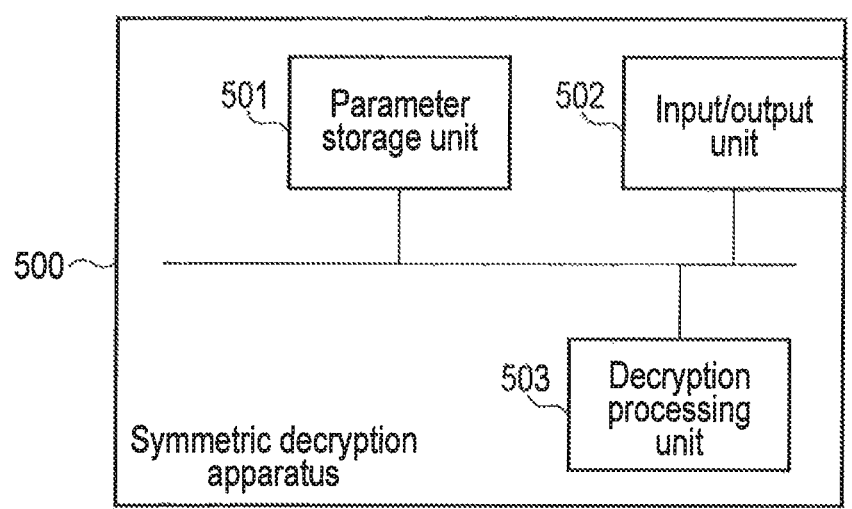
FIG. 8 is a block diagram schematically showing the arrangement of a symmetric decryption apparatus according to the second embodiment.

FIG. 7 is a block diagram showing the arrangement of a symmetric encryption apparatus according to the second embodiment. FIG. 8 is a block diagram showing the arrangement of a symmetric decryption apparatus according to the second embodiment.

A symmetric encryption apparatus 400 includes a parameter storage unit 401, an input/output unit 402, and an encryption processing unit 403.

The parameter storage unit 401 stores security parameters in addition to the above-described secret key sk. The parameter storage unit 401 may store information of the space $F_q[t]$ and the space $(F_q[t])$ [x, y]. The parameter storage unit 401 may also store information of the encoding processing Ecd.

The input/output unit 402 accepts the input of the plaintext msg, and outputs the ciphertext c(x, y) calculated by the encryption processing unit 403.

The encryption processing unit 403 calculates the ciphertext c(x, y) based on the plaintext msg whose input has been accepted by the input/output unit 402 and the information stored in the parameter storage unit 401.

On the other hand, as shown in FIG. 8, a symmetric decryption apparatus 500 includes a parameter storage unit 501, an input/output unit 502, and a decryption processing unit 503.

The parameter storage unit 501 stores security parameters in addition to the secret key sk. The parameter storage unit 501 may store information of the space $F_q[t]$ and the space $(F_q[t])$[x, y]. The parameter storage unit 501 may also store information of the decoding processing Dcd.

The input/output unit 502 accepts the ciphertext c(x, y) as an input, and outputs the plaintext msg=msg'.

The decryption processing unit 503 decrypts the ciphertext c(x, y) based on the ciphertext c(x, y) accepted by the input/output unit 502 and the information stored in the parameter storage unit 501, thereby obtaining the plaintext msg=msg' as the decryption result msg'.

The operations of the symmetric encryption apparatus and symmetric decryption apparatus which have the above arrangements will be described with reference to flowcharts shown in FIGS. 9 and 10, respectively.

Figure 9:
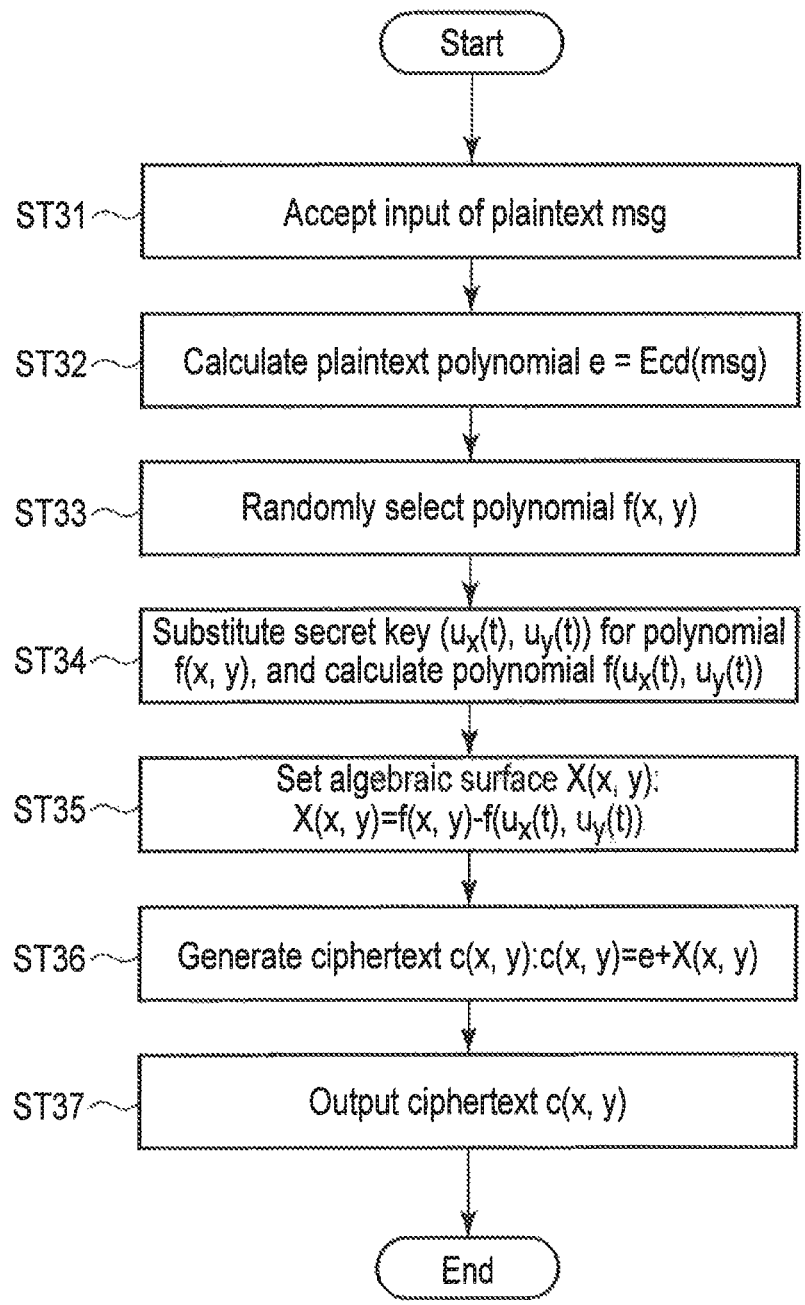
FIG. 9 is a flowchart for explaining encryption processing according to the second embodiment.

As shown in FIG. 9, in the symmetric encryption apparatus 400, the input/output unit 402 accepts the input of the plaintext msg (step ST31). The parameters in the parameter storage unit 401 are read out by the encryption processing unit 403, as needed. The parameters are, for example, the section $(u_x(t), u_y(t))$ and the space $(F_q[t])$ [x, y].

The encryption processing unit 403 executes encoding processing to embed the plaintext msg in each term of the polynomial in the subspace M of the space $F_q[t]$, thereby calculating the plaintext polynomial e=Ecd(msg) (step ST32).

The encryption processing unit 403 generates the algebraic surface polynomial X(x, y) having the section polynomial $(u_x(t), u_y(t))$ as a solution based on the space $(F_q[t])$[x, y] defined over the space $F_q[t]$. For example, the encryption processing unit 403 randomly selects the algebraic surface polynomial X(x, y) from the space $(F_q[t])$[x, y](steps ST33 to ST35). Note that the algebraic surface polynomial X(x, y) is added to the plaintext polynomial e, thereby concealing the plaintext polynomial e.

More specifically, the encryption processing unit 403 randomly selects the polynomial f(x, y) from the space $(F_q[t])$[x, y](step ST33). The polynomial f(x, y) may be referred to as a random polynomial f(x, y).

The encryption processing unit 403 calculates the polynomial $f(u_x(t), u_y(t))$ obtained by substituting the secret key $(u_x(t), u_y(t))$ for the two variables x and y of the polynomial f(x, y) (step ST34), and sets the algebraic surface polynomial $X(x, y)=f(x, y)-f(u_x(t), u_y(t))$ (step ST35).

Note that the algebraic surface polynomial X(x, y) and polynomial f(x, y) may be selected from a subset of the space $(F_q[t])$[x, y] instead of the space $(F_q[t])$[x, y].

Alternatively, the algebraic surface polynomial X(x, y) and polynomial f(x, y) may be selected depending on the date/time when encryption is processed, the secret key sk, or the plaintext, instead of being randomly selected. Steps ST33 to ST35 may be executed before the execution of step ST31.

The encryption processing unit 403 calculates the ciphertext c(x, y)=e+X(x, y) by adding the plaintext polynomial e and the algebraic surface polynomial X(x, y) (step ST36).

The symmetric encryption apparatus 400 outputs the ciphertext c(x, y) from the input/output unit 402 (step ST37).

The operation of the symmetric encryption apparatus 400 has been explained above. The operation of the symmetric decryption apparatus 500 will be described next.

Figure 10:
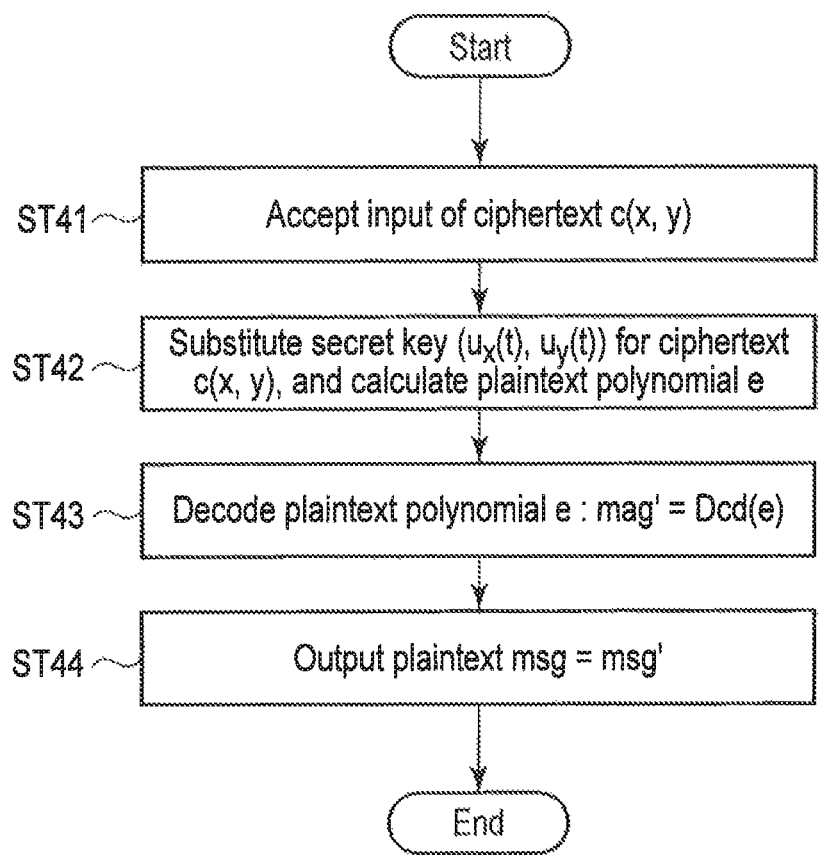
FIG. 10 is a flowchart for explaining decryption processing according to the second embodiment.

In the symmetric decryption apparatus 500, as shown in FIG. 10, the input/output unit 502 accepts the input of the ciphertext c(x, y) (step ST41).

The decryption processing unit 503 decrypts the ciphertext c(x, y) into the plaintext polynomial e based on the secret key sk=$(u_x(t), u_y(t))$ in the parameter storage unit 501. For example, the decryption processing unit 503 substitutes the secret key sk=$(u_x(t), u_y(t))$ for the ciphertext c(x, y), and calculates the plaintext polynomial e (step ST42), as given by:

$$c(u_x(t), u_y(t)) = e + X(u_x(t), u_y(t))$$
$$= e$$

The decryption processing unit 503 decrypts the decrypted plaintext polynomial e into the plaintext msg. That is, the decryption processing unit 503 decodes the plaintext polynomial e, and calculates the decryption result msg'=Dcd(e) (step ST43).

As described above, for example, when Ecd(msg)= e=$\Sigma msg_i t^{i-1}$ where msg=$msg_1 \| msg_2 \| \ldots \| msg_n$, the polynomial $c(u_x(t), u_y(t))$ calculated in step ST42 is the plaintext polynomial e=$\Sigma msg_i t^{i-1}$ with the variable t. It is, therefore, possible to perform decoding into the plaintext msg=msg' by assigning the coefficient of $t^i$ to a bit string $msg'_i$, and setting the decryption result msg'=$msg'_1 \| msg'_2 \| \ldots \| msg'_n$.

Finally, the symmetric decryption apparatus 500 outputs the plaintext msg=msg' from the input/output unit 502 (step ST44).

According to this embodiment, as described above, the algebraic surface polynomial X(x, y) representing an algebraic surface defined over the space $F_q[t]$(polynomial ring S) is used as the mask polynomial in the first embodiment. The algebraic surface is a zero set represented by the algebraic surface polynomial X(x, y) having two variables x and y, and a curve obtained by parameterizing x and y by t exists. The section polynomial $(u_x(t), u_y(t))$ representing the curve is used as the secret key sk (symmetric key) in the first embodiment. With this arrangement, it is possible to obtain the same effects as those in the first embodiment.

That is, according to this embodiment, with the arrangement in which the ciphertext c(x, y) is generated by processing of generating the plaintext polynomial e by embedding the plaintext msg in each term of the polynomial in the subspace of the space $F_q[t]$, and adding the plaintext polynomial e and the algebraic surface polynomial (mask polynomial) having the section polynomial (symmetric key) as a solution, it is possible to increase the parallelism and improve the calculation efficiency.

Furthermore, according to this embodiment, with the arrangement in which when the input of the thus generated ciphertext c(x, y) is accepted, the ciphertext c(x, y) is decrypted into the plaintext polynomial e based on the symmetric key (section polynomial), and the decrypted plaintext polynomial e is decrypted into the plaintext msg, it is possible to increase the parallelism and improve the calculation efficiency.

Therefore, as described above, it is possible to embed a multi precision plaintext in one ciphertext, and encrypt a plaintext with a size larger than the processing unit of a CPU without performing data processing with multi precision.

<Modifications of Second Embodiment>

In the second embodiment, it is also possible to configure modifications associated with homomorphic calculation and encoding processes (1) to (7), as in Modification 2 and other modifications of the first embodiment.

Similarly to the first embodiment, in the above-described second embodiment and modifications, the mask polynomial $X(x, y)$ having the secret key sk as a solution is used to perform encryption processing according to $c(x, y)=X(x, y)+e$. At this time, a reversible element D (for example, D=1) in the subspace M may be used to calculate the encryption processing as $c(x, y)=[X(x, y)+D]*e$, where "*" represents multiplication in R. In this case, the secret key sk may be input to the ciphertext $c(x, y)$ to calculate $c(u_x(t), u_y(t))=[X(x, y)+D]*e=D*e$, thereby calculating e by dividing $D*e$ by D.

According to at least one of the above-described embodiments, with an arrangement in which a ciphertext is generated by processing of generating a plaintext polynomial by embedding plaintext information in each term of a polynomial in a subspace of a polynomial ring, and adding the plaintext polynomial and a mask polynomial having a symmetric key as a solution, it is possible to increase the parallelism and improve the calculation efficiency.

Furthermore, with an arrangement in which when the input of the thus generated ciphertext is accepted, the ciphertext is decrypted into the plaintext polynomial based on the symmetric key, and the decrypted plaintext polynomial is decrypted into the plaintext information, it is possible to increase the parallelism and improve the calculation efficiency.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A symmetric encryption apparatus comprising:
a storage unit configured to store a symmetric key formed from a plurality of elements of a first polynomial ring;
a plaintext acceptance unit configured to accept input of plaintext information;
a plaintext polynomial generation unit configured to generate a plaintext polynomial by embedding the plaintext information whose input has been accepted in at least one of terms of a polynomial in a subspace of the first polynomial ring;
a mask polynomial generation unit configured to generate a mask polynomial having the symmetric key as a solution based on a second commutative ring defined over the first polynomial ring; and
an encryption unit configured to generate a ciphertext using the plaintext polynomial and the mask polynomial.

2. The apparatus according to claim 1, wherein the plaintext polynomial generation unit additively divides the plaintext information into a plurality of pieces of partial information, and embeds the plurality of pieces of partial information as coefficients of respective terms of the plaintext polynomial.

3. The apparatus according to claim 1, further comprising a homomorphic calculation unit configured to, when the plaintext polynomial generation unit, the mask polynomial generation unit, and the encryption unit separately generate two ciphertexts from two plaintext polynomials, generate a new ciphertext by homomorphic calculation processing of adding the two ciphertexts,
wherein a result of decrypting the new ciphertext based on the symmetric key is equal to a result of adding the two plaintext polynomials.

4. The apparatus according to claim 1, wherein
the mask polynomial is an algebraic surface polynomial representing an algebraic surface defined over the polynomial ring,
the algebraic surface is a zero set represented by the algebraic surface polynomial having two variables x and y, and a curve obtained by parameterizing x and y by t exists, and
the symmetric key is a section polynomial representing the curve.

5. A symmetric decryption apparatus comprising:
a ciphertext acceptance unit configured to accept input of a ciphertext generated using a plaintext polynomial generated by embedding plaintext information in at least one of terms of a polynomial in a subspace of a first polynomial ring, and a mask polynomial which has, as a solution, a symmetric key formed from a plurality of elements of the first polynomial ring, and has been generated based on a second commutative ring defined over the first polynomial ring;

a storage unit configured to store the symmetric key;

a plaintext polynomial decryption unit configured to decrypt the ciphertext into a plaintext polynomial based on the symmetric key in the storage unit; and a decryption unit configured to decrypt the decrypted plaintext polynomial into the plaintext information.

6. The apparatus according to claim 5, wherein the plaintext information is additively divided into a plurality of pieces of partial information, and the plurality of pieces of partial information are embedded in respective terms of the plaintext polynomial as coefficients, and the decryption unit performs decryption into the plaintext information by extracting coefficients of respective terms of the decrypted plaintext polynomial as the plurality of pieces of partial information, and calculating a total sum of the plurality of pieces of partial information.

7. The apparatus according to claim 5, wherein the ciphertext whose input has been accepted has been generated by homomorphic calculation processing of adding two ciphertexts separately generated from two plaintext polynomials, and a decryption result of the decryption unit is equal to a result of adding the two plaintext polynomials.

8. The apparatus according to claim 5, wherein the mask polynomial is an algebraic surface polynomial representing an algebraic surface defined over the polynomial ring, the algebraic surface is a zero set represented by the algebraic surface polynomial having two variables x and y, and a curve obtained by parameterizing x and y by t exists, and the symmetric key is a section polynomial representing the curve.

9. A non-transitory computer-readable storage medium storing a symmetric encryption program to be executed by a computer including a storage unit, the symmetric encryption program comprising:

a first program code of causing the computer to execute processing of writing a symmetric key formed from a plurality of elements of a first polynomial ring in the storage unit;

a second program code of causing the computer to execute processing of accepting input of plaintext information;

a third program code of causing the computer to execute processing of generating a plaintext polynomial by embedding the plaintext information whose input has been accepted in at least one of terms of a polynomial in a subspace of the first polynomial ring;

a fourth program code of causing the computer to execute processing of generating a mask polynomial having the symmetric key as a solution based on a second commutative ring defined over the first polynomial ring; and a fifth program code of causing the computer to execute processing of generating a ciphertext using the plaintext polynomial and the mask polynomial.

10. A non-transitory computer-readable storage medium storing a symmetric decryption program to be executed by a computer including a storage unit, the symmetric decryption program comprising:

a first program code of causing the computer to execute processing of accepting input of a ciphertext generated using a plaintext polynomial generated by embedding plaintext information in at least one of terms of a polynomial in a subspace of a first polynomial ring, and a mask polynomial which has, as a solution, a symmetric key formed from a plurality of elements of the first polynomial ring, and has been generated based on a second commutative ring defined over the first polynomial ring;

a second program code of causing the computer to execute processing of writing the symmetric key in the storage unit;

a third program code of causing the computer to execute processing of decrypting the ciphertext into a plaintext polynomial based on the symmetric key in the storage unit; and a fourth program code of causing the computer to execute processing of decrypting the decrypted plaintext polynomial into the plaintext information.

\* \* \* \* \*